(12) United States Patent
Komatsu et al.

(10) Patent No.: US 6,326,564 B1
(45) Date of Patent: Dec. 4, 2001

(54) SENSITIVE COORDINATE INPUT DEVICE

(75) Inventors: Yasuhiro Komatsu, Osaka; Shunji Muraoka, Sakai; Shuji Osawa; Hideki Nishiyama, both of Yao, all of (JP)

(73) Assignee: Hosiden Corporation, Osaka-fu (JP)

( * ) Notice: Subject to any disclaimer, the term of this patent is extended or adjusted under 35 U.S.C. 154(b) by 1060 days.

(21) Appl. No.: 08/495,390

(22) Filed: Jun. 28, 1995

(30) Foreign Application Priority Data

Dec. 20, 1994 (JP) .................................................. 6-316284

(51) Int. Cl.[7] ............................. G06K 11/06; G08C 21/00
(52) U.S. Cl. ...................... 178/18.01; 345/173; 341/33; 703/2
(58) Field of Search ........................... 395/500; 364/488; 345/161, 173, 176; 178/18, 19

(56) References Cited

U.S. PATENT DOCUMENTS

| | | | |
|---|---|---|---|
| 4,713,496 | * 12/1987 | Kimura et al. ........................ | 178/18 |
| 4,825,017 | * 4/1989 | Hobara ................................ | 178/18 |
| 4,890,096 | * 12/1989 | Taguchi et al. ..................... | 178/19 |
| 4,990,900 | * 2/1991 | Kikuchi .............................. | 178/18 |
| 5,177,328 | * 1/1993 | Ito et al. ............................ | 178/18 |
| 5,324,895 | * 6/1994 | Inamori et al. ..................... | 178/18 |
| 5,479,191 | * 12/1995 | Komatsu ............................. | 345/161 |
| 5,518,078 | * 5/1996 | Tsujioka et al. ..................... | 178/18 |
| 5,530,209 | * 6/1996 | Watanabe et al. ................... | 178/18 |
| 5,589,857 | * 12/1996 | Tanahashi et al. .................. | 345/174 |
| 5,606,346 | * 2/1997 | Kai et al. ............................ | 345/173 |

* cited by examiner

Primary Examiner—Kevin J. Teska
Assistant Examiner—Samuel Broda
(74) Attorney, Agent, or Firm—Jones, Tullar & Cooper, P.C.

(57) ABSTRACT

The sensitive coordinate input device of the present invention adopts a system in which the finger F of the operator is regarded as one electrode, and the electrostatic capacitance is varied depending on the changes in the distances between the finger and another electrode which is separated therefrom via a dielectric. Four electrodes are preferably disposed at regular angular positions. Among the four electrodes, two electrodes, and two electrodes which are located at opposite positions are spaced at intervals, respectively. Across the four electrodes, a sensitive member 15 is laid. The surface of the sensitive member is to be touched with the operator's finger F. The sensitive member is preferably formed by a dielectric having a high dielectric constant, such as a ceramic plate. According to the present invention, the area of sensitive area can easily be increased, and the determination of the cursor position on the screen of the CRT display apparatus can readily be performed.

2 Claims, 4 Drawing Sheets

SENSITIVE COORDINATE INPUT DEVICE

BACKGROUND OF THE INVENTION

1. Field of the Invention

The present invention relates to a sensitive coordinate input device which is capable of changing a coordinate signal based on variation of electrostatic capacitance, and particularly to a sensitive coordinate input device adopting a system in which an operator's finger is regarded as one electrode, and an electrostatic capacitance is varied depending on a change in the distance between the finger and another electrode which is separated therefrom by a dielectric.

2. Description of the Prior Art

Conventional coordinate input devices include a mouse, a track ball, a controller, a cursor key, and the like, and also a sensitive coordinate input device.

Prior art examples of such a sensitive coordinate input device is shown for explanation in FIGS. 3, 4, and 5.

The sensitive coordinate input device shown in FIGS. 3 and 4 comprises four electrodes 1, 2, 3, and 4 which are closely arranged at regular angular positions. A dielectric film 5 is disposed so as to cover these electrodes 1 to 4. The sensitive coordinate input device converts variation of electrostatic capacitance which is caused by pressing the dielectric film 5 with an operator's finger F or by moving the finger F on the dielectric film 5, into a coordinate signal by a conversion circuit which is not shown.

The sensitive coordinate input device shown in FIG. 5 is described in Japanese National Patent Publication No. 4-507316 (WO 91/03039). In this sensitive coordinate input device, a plurality of columns of first electrodes 6 convert variation of electrostatic capacitance which is caused by making the operator's finger F contact with the second electrodes 7, into a coordinate input signal by a conversion circuit which is not shown.

In the sensitive coordinate input device described with reference to FIGS. 3 and 4, the electrostatic capacitance is varied in accordance with the increase or decrease of the contact area in which the finger F is in contact with the dielectric films. Therefore, in the case where the electrodes 1 and 2 are assigned to indicate the X axis on the screen of a CRT display apparatus, and the electrodes 3 and 4 are assigned to indicate the Y axis thereon, in order that the movement of the cursor on the screen of the CRT display apparatus always follows the movement of the finger F on the dielectric film 5, it is necessary to closely dispose the four electrodes 1 to 4 as shown in FIG. 3.

The sensitive coordinate input device described with reference to FIG. 5 is considered to adopt a system in which the electric field is disturbed by depressing the second electrodes 7 with the finger F, thereby varying the electrostatic capacitance C. Accordingly, in the case where two of the four overlap portions formed by the columns of first electrodes 6 and the rows of second electrodes 7 are assigned to indicate the X axis on the screen of the CRT display apparatus, and the remaining two overlap portions are assigned to indicate the Y axis thereon, in order that the movement of the cursor on the CRT display apparatus always follows the movement of the finger F on the second electrodes 7, it is necessary to closely dispose the plural columns of first electrodes 6 and the plural rows of second electrodes 7, in the same way as in the prior art example shown in FIGS. 3 and 4.

However, in a sensitive coordinate input device in which electrodes must be closely disposed as in the above-described two examples, if attempts to improve operability by increasing an area of a sensitive area, i.e., an electrode formation area, the will have to be modified in the following manner. In the example shown in FIGS. 3 and 4, the sizes of the electrodes 1 to 4 must be increased, and, in the example shown in FIG. 5, the number of columns of first electrodes 6 and the number of rows of second electrodes 7 must be increased. In the example shown in FIGS. 3 and 4, the increase of the size of each of the electrodes 1 to 4 inevitably results in an increase in cost for forming electrodes on a substrate. In the example shown in FIG. 5, an increase in the number of columns of first electrodes 6 and rows of second electrodes 7 inevitably results in a complicated construction. For these reasons, the sensitive area is conventionally confined to a small rectangular area having a side of about 20 mm, or to a small circular area having a diameter of about 20 mm. Such a small sensitive area, however, hinders improvement in operability.

The contact area with the finger F is varied because of various magnitudes of forces exerted when the finger F touches the dielectric film 5 or the second electrodes 7, and accordingly the electrostatic capacitance is varied. Thus, there exists a problem in that it is difficult to determine the position of the cursor on the CRT display apparatus.

SUMMARY OF THE INVENTION

The present invention has been conducted in view of the aforementioned circumstances and problems.

The present invention has been accomplished by adopting a system in which an operator's finger is regarded as one electrode, and an electrostatic capacitance is varied by changing the distance between the finger and another electrode which is separated therefrom by a dielectric.

It is an object of the present invention to provide a sensitive coordinate input device in which the sensitive area can easily be increased, and the position of the cursor can readily be determined on the screen of a CRT display apparatus.

The sensitive coordinate input device according to the present invention comprises at least two electrodes which are spaced by an interval, and a sensitive member made of a dielectric, the sensitive member extending across the two electrodes, and the surface of the sensitive member being touched with a finger.

The number of the electrodes is not limited to two, but may be four. In the case of four electrodes, the four electrodes are disposed at regular angular positions, and respective two electrodes which are located at opposite positions among the four electrodes are spaced by an interval. A sensitive member made of a dielectric is laid across the four electrodes. The surface of the sensitive member is to be touched with a finger. It is preferable that the sensitive member is made of a ceramic plate.

In general, an electrostatic capacitance C between conductors is expressed by the following expression:

$$C = \in (s/d) \tag{1}$$

where $\in$ denotes a dielectric constant, s denotes a counter area of the conductors, and d denotes a distance between the counter conductors. Accordingly, the electrostatic capacitance C is varied by changing any one of $\in$, s, and d.

In the sensitive coordinate input device according to the present invention, the electrostatic capacitance C is varied by changing d in expression (1). Specifically, when the operator moves the finger on the surface of the dielectric sensitive member, the finger comes closer to or further from either of the two or four electrodes, and hence d in expression (1) is changed.

According to the present invention, the electrostatic capacitance is accurately affected by the finger which is in contact with the sensitive member at a position distant from the two or four electrodes, so that operability can easily be improved by increasing the size the sensitive member. Advantageously, the increase of in size of the sensitive member does not involve an increase of cost or a complication of the construction. These advantages are remarkably attained by using a ceramic plate having a high dielectric constant as the sensitive member. Since the present invention adopts a system in which the electrostatic capacitance is varied depending on the change of the distance between the finger and the electrode, the magnitude of the force exerted when the finger touches the sensitive member does not affect the electrostatic capacitance. This is advantageously useful for easily determining the cursor position on the screen of the CRT display apparatus.

DETAILED DESCRIPTION OF THE PREFERRED EMBODIMENT

In FIGS. 1 and 2, 11, 12, 13, and 14 designate bar-like electrodes. As the four electrodes 11 to 14, for example, electrodes which are formed as printed patterns on a printed wiring board P can be used. The four electrodes 11 to 14 are disposed at regular angular positions (90 deg.). Among the four electrodes 11 to 14, two electrodes 11 and 12 which are disposed at opposite positions are spaced with a large interval A, and two electrodes 13 and 14 which are disposed at opposite positions are spaced with a large interval B. Across the four electrodes 11 to 14, a sensitive member 15 made of a dielectric is laid. The surface of the sensitive member 15 is to be touched with a finger F of an operator. As the sensitive member 15, a ceramic plate having a low capacitive resistance and a high dielectric constant (i.e., ∈ is large) is preferably used. Alternatively, it is possible to use a dielectric sheet-like member as the sensitive member 15. As the dielectric, in place of ceramic, paper, synthetic resin, or the like can be appropriately selected and used.

Figure 1:
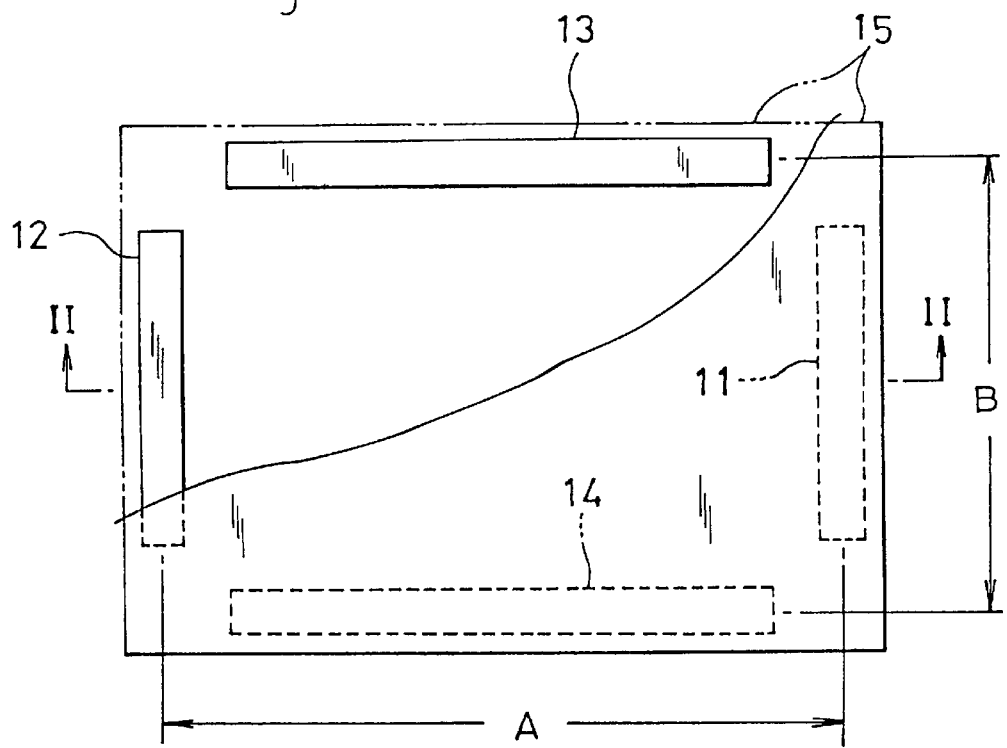
FIG. 1 is a partial cutaway plan view of a sensitive coordinate input device of an embodiment according to the present invention.
Figure 2:
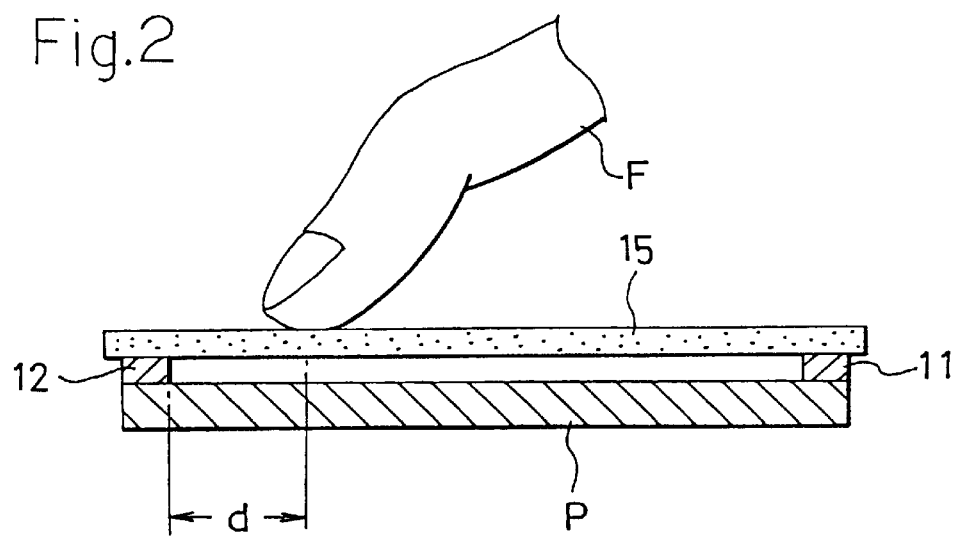
FIG. 2 is a diagram illustrating an operation and corresponding to a cross section view taken along a line II—II in FIG. 1.
Figure 3:
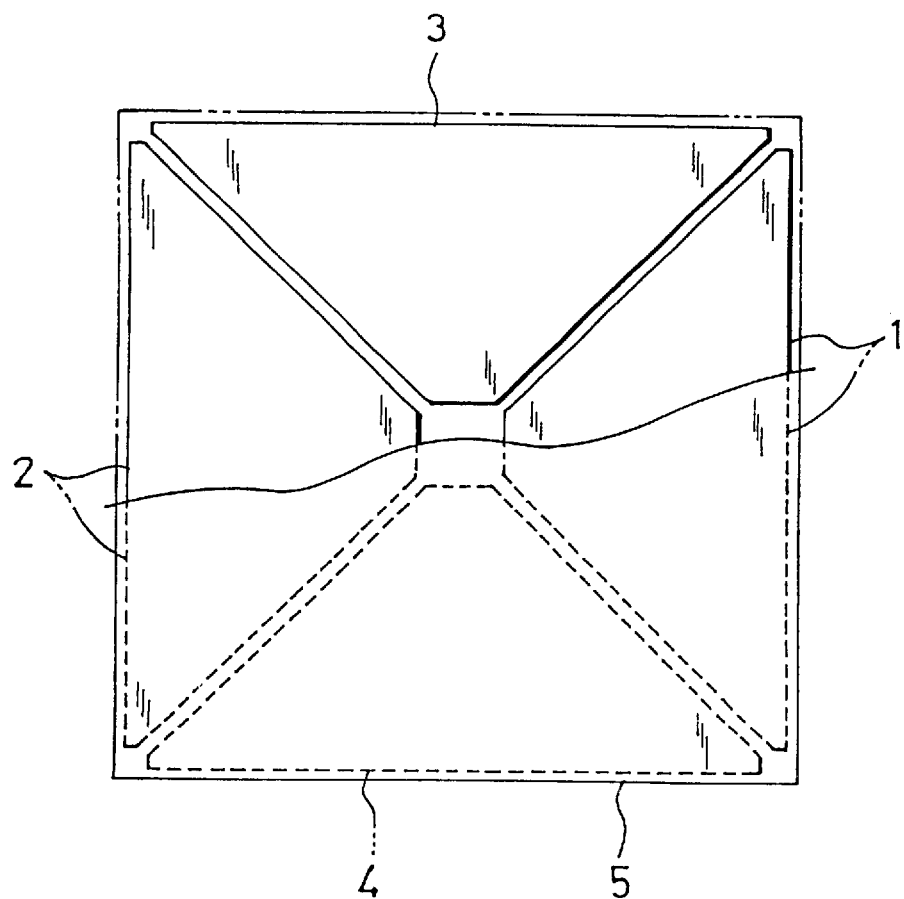
FIG. 3 is a partial cutaway plan view of a prior art example.
Figure 4:
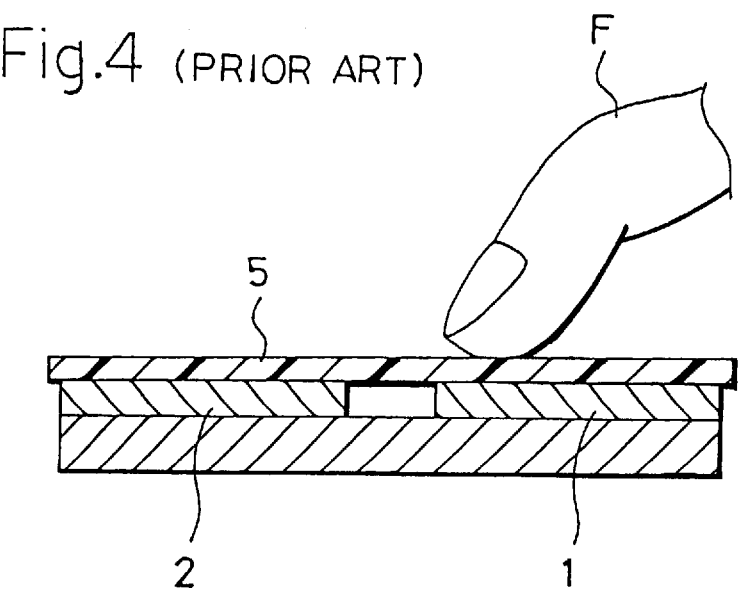
FIG. 4 is a diagram for illustrating an operation and corresponding to an end view of the prior art example shown in FIG. 3.
Figure 5:
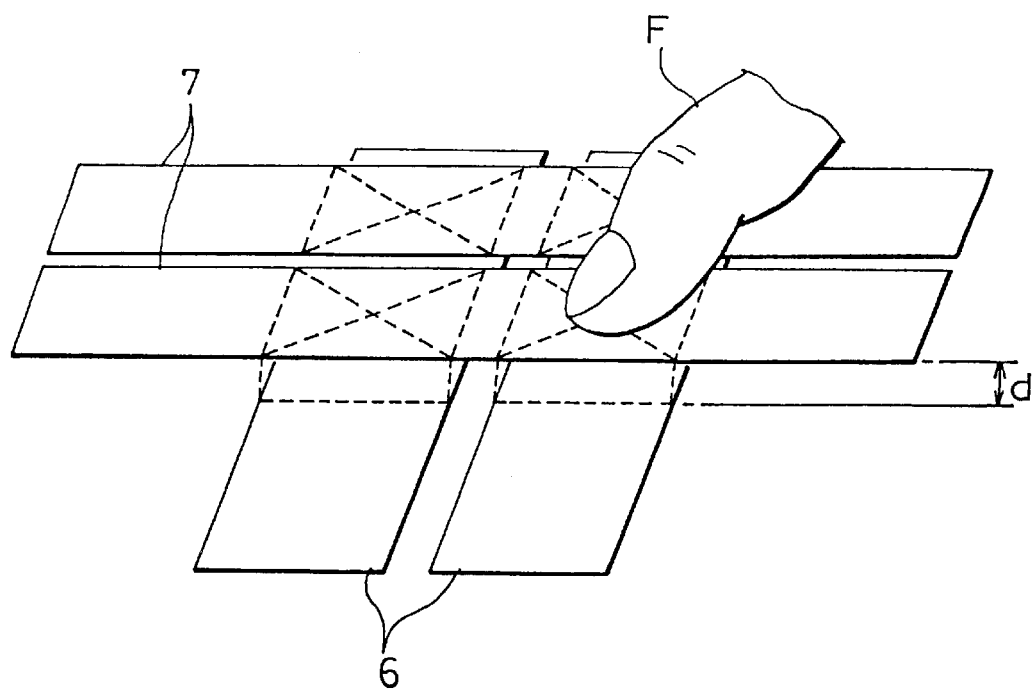
FIG. 5 is a diagram illustrating an operation in which another prior art example is shown in a schematic perspective view.

According to the above-described sensitive coordinate input device, when the operator makes the contract with finger F on the surface of the sensitive member 15 as shown in FIG. 2, for example, a predetermined electrostatic capacitance C is obtained on the basis of expression (1) above or in accordance with the distance d between the electrode 12 and the finger F. Accordingly, when the distance d is changed by moving the finger F on the surface of the sensitive member 15, the electrostatic capacitance C is accordingly varied. If the variation in the electrostatic capacitance at that time is converted into a coordinate signal by a conversion circuit which is not shown, the cursor can be moved on the screen of a CRT display apparatus.

Figure 6:
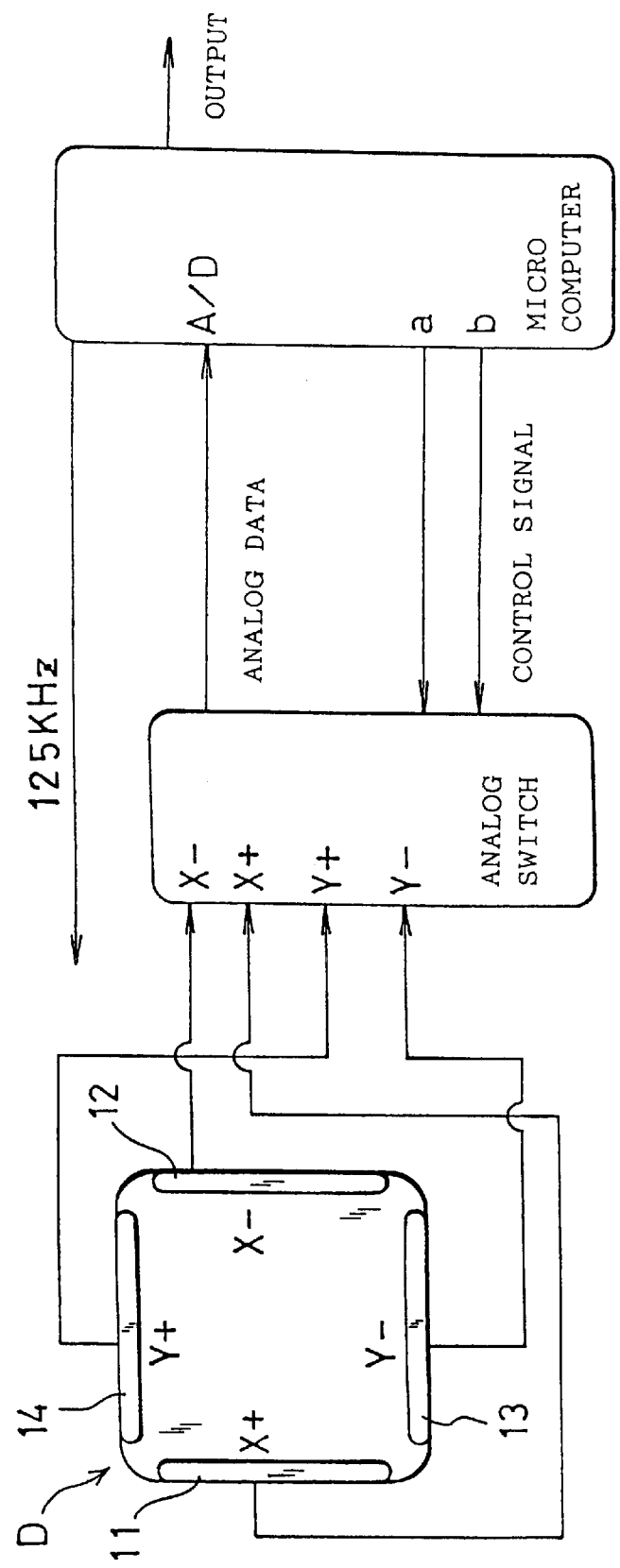
FIG. 6 is a diagram of a circuit for outputting a coordinate signal which is input through a sensitive coordinate input device.

FIG. 6 shows an example of a circuit for outputting a coordinate signal which is input through a sensitive coordinate input device. In a sensitive coordinate input device D shown in the figure, the electrodes 11 and 12 correspond to the X axis on the screen of the CRT display apparatus, and the electrodes 13 and 14 correspond to the Y axis thereon. To each of the four electrodes 11 to 14, an AC voltage of 125 kHz is applied.

When the operator moves the finger on the surface of the sensitive member 15, the capacitances of the individual electrodes 11 to 14 are varied depending on the changes of the distances between the finger and the individual electrodes 11 to 14. Based on the variation of the capacitances, voltages are changed. The voltages are taken out from the electrodes 11 to 14, and the voltage signals are converted into analog data which are then processed by a so-called microcomputer. Thus, the movement of the cursor on the display screen follows the movement of the finger F. In this case, for example, voltage changes in the respective electrodes 11 to 14 are read at a sampling rate of 50 msec, and the cursor position corresponding to the X and Y coordinates on the display screen which are generated by the movement of the finger is calculated. Based on the calculated result, the cursor can be moved.

If the cursor is required to move only in the X-axis direction or in the Y-axis direction, for example, it is sufficient to provide two electrodes with an interval.

If a ceramic having a high dielectric constant is used as the dielectric for the sensitive member 15, the electrostatic capacitances are accurately reflected and influenced by the finger F which touches the sensitive member 15 at a position distant from the electrodes 11 to 14. Accordingly, if the size of the sensitive member 15 is increased by disposing the electrodes 11 to 14 only on the four sides of a large rectangular sensitive area, or by disposing the electrodes 11 to 14 at four positions along a circumferential direction of a large circular sensitive area, operability can easily be improved. In addition, a system in which the electrostatic capacitance is varied in accordance with the changes of the distances between the finger F and the respective electrodes 11 to 14 is adopted, so that the magnitude of the force exerted when the finger F touches the sensitive member 15 does not affect the electrostatic capacitance. Accordingly, a determination of the cursor position on the CRT display apparatus can easily be attained.

What is claimed is:

1. A sensitive coordinate input device comprising: at least two electrodes spaced relative to each other at an interval; and a sensitive member made of a dielectric, said sensitive member extending across said at least two electrodes, with a surface of said sensitive member adapted to be touched with a finger, wherein said sensitive member is made of a ceramic plate.

2. A sensitive coordinate input device comprising: four electrodes disposed at regular angular positions; and a dielectric extending across said four electrodes, wherein respective two of said four electrodes which are disposed at opposite positions are spaced with an interval, said dielectric extending across said four electrodes forming a sensitive member, with a surface of said sensitive member adapted to be touched with a finger, and wherein said sensitive member is made of a ceramic plate.

* * * * *